(12) United States Patent
Benn et al.

(10) Patent No.: US 8,886,765 B2
(45) Date of Patent: Nov. 11, 2014

(54) SYSTEM AND METHOD FOR PREDICITIVE TRICK PLAY USING ADAPTIVE VIDEO STREAMING

(75) Inventors: Howard P. Benn, Swindon (GB); Jian Jun Wu, Reading (GB)

(73) Assignee: Motorola Mobility LLC, Libertyville, IL (US)

( * ) Notice: Subject to any disclaimer, the term of this patent is extended or adjusted under 35 U.S.C. 154(b) by 265 days.

(21) Appl. No.: 13/285,082

(22) Filed: Oct. 31, 2011

(65) Prior Publication Data

US 2013/0110980 A1 May 2, 2013

(51) Int. Cl.
*G06F 15/16* (2006.01)
*H04N 21/00* (2011.01)
*H04N 21/2387* (2011.01)

(52) U.S. Cl.
CPC ........... *H04N 21/00* (2013.01); *H04N 21/2387* (2013.01)
USPC ....................................................... 709/219

(58) Field of Classification Search
CPC ................................. H04N 21/2387
USPC ....................................................... 709/219
See application file for complete search history.

(56) References Cited

U.S. PATENT DOCUMENTS

| 7,525,965 | B1 | 4/2009 | St. Pierre et al. |
| 7,610,605 | B2 | 10/2009 | Negishi et al. |
| 7,647,614 | B2 | 1/2010 | Krikorian et al. |
| 7,729,590 | B2 | 6/2010 | Kosugi |
| 7,962,942 | B1 | 6/2011 | Craner |
| 2011/0228846 | A1 | 6/2011 | Wei et al. |
| 2012/0210216 | A1* | 8/2012 | Hurst ............................. 715/716 |
| 2013/0019273 | A1* | 1/2013 | Ma et al. ......................... 725/90 |

FOREIGN PATENT DOCUMENTS

EP 963118 A1 12/1999

* cited by examiner

*Primary Examiner* — Arvin Eskandarnia
(74) *Attorney, Agent, or Firm* — Lowenstein Sandler LLP (57) ABSTRACT

A system utilized by a user, a server, and a content output device; the server being operable to provide a stream of input content. The content output device can output content based on the stream of input content. The stream of input content includes a chunk of content data. The system includes a receiver, an interactive playback controller portion, a playback indicator, a storage portion and an output portion. The receiver can receive the stream of input content as downloaded data. The playback indicator can indicate a location of the chunk within the stream of input content. The storage portion can store the downloaded data. The output portion can output an output signal, based on the downloaded data, to the content output device. The interactive playback controller portion can enable the user to instruct the output portion to output the chunk of content data as the output signal.

19 Claims, 5 Drawing Sheets

SYSTEM AND METHOD FOR PREDICITIVE TRICK PLAY USING ADAPTIVE VIDEO STREAMING

BACKGROUND

Streaming video enables a user to view content while the content is in the process of being delivered. Adaptive or dynamic bit rate streaming provides content which may be adapted in order accommodate the performance of a user's network.

Dynamic streaming is the process of efficiently delivering streaming video to users by dynamically switching among different content streams of varying quality and size during playback.

For adaptive bit rate streaming, content files are segmented into smaller portions with each portion having its own Uniform Resource Locator (URL). The timing associated with each portion of content is provided to a content provider via a downloaded manifest. As a non-limiting example, a manifest may be configured as Extensible Markup Language (XML).

Rate adaptation is performed using multiple URLs for each content file, which are encoded using varying formats, which results in a variety of file sizes associated with a content file.

Conventional systems download and render content via a linear time sequence with an associated starting location and ending location. Conventional systems perform well for viewing prior portions of content (e.g. rewind), however, viewing future portions of content (e.g. skipping forward or fast forward) results in poor access as presented content may cease providing access while new information is downloaded and buffered.

What is needed are improved methods for providing access to streaming content.

BRIEF SUMMARY

The present invention provides a system for providing forward looking content (e.g. fast forward) without experiencing periods of no content presentation while the system is in the process of downloading the forward looking content.

In accordance with an aspect of the present invention, a system is provided for use by a user and with a server and a content output device, the server being operable to provide a stream of input content. The content output device can output content based on the stream of input content. The stream of input content includes a chunk of content data. The system includes a receiver, an interactive playback controller portion, a playback indicator, a storage portion and an output portion. The receiver can receive the stream of input content as downloaded data. The playback indicator can indicate a location of the chunk within the stream of input content. The storage portion can store the downloaded data. The output portion can output an output signal, based on the downloaded data, to the content output device. The interactive playback controller portion can enable the user to instruct the output portion to output the chunk of content data as the output signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

A concept in accordance with the present invention may be thought of as a social network powered fast forward. Potential fast forward information may be downloaded in anticipation of being selected with the potential fast forward information downloaded determined by the previous selections of other users associated with a social network. It may also be thought of as anticipatory trick play based on typical user behavior. In particular, a media server in an adaptive HTTP streaming system can learn the "hot spots" in specific media content from the behavior of other viewers, or anticipate the "hot spots" based on historical behavior of a particular user. The "hot spots" are the location in a media stream that are likely to be of more than typical interest. "Hot spots" would tend to be things like bit sports plays, goals, scene changes, normal fast forward intervals, and the like.

In accordance with an aspect of the present invention, a predictive trick play is enabled by way of a two-way sharing of "hot spot" data between a media client and a server. The server collects trick play data from the client when the trick play actions are initiated. The server saves trick play data and associates it with the specific media content by saving it in a media manifest, for example. The media server downloads the manifest that is associated with requested media content and examines the manifest for "hot spots." If "hot spots" are found, the client reduces the bit rate requested for media chunks associated with the normal-speed content in order to make bandwidth available to download media chunks associated with "hot spot" content. "Hot spot" content is retrieved from local storage and rendered by the media client when a corresponding trick play action is requested.

In accordance with aspects of the present invention, a communication system provides delivery of frequently selected location information, content and lower rate frequently selected content from a server to a client. Furthermore, client provides location information to server. Client may select to reduce the bandwidth for downloading content in order to accommodate downloading lower rate frequently select content. Delivery of content may be preempted with frequently selected lower rate content by selection of content located forward in time. Furthermore, presentation of lower rate frequently selected content is replaced with higher rate content once higher rate content has been received by client. System provides the capability to view forward-in-time portions of a video at a lower rate until a higher rate version of the content has been downloaded and is available for presentation.

As an example illustration, presume that a user (client) selects and downloads a movie (content) from a digital movie provider (server). As the user is viewing downloaded movie, consider that the user performs trick play at certain times, e.g., fast forwards past the credits, rewinds during a particularly exciting part to view it again, and performing other associated navigation operations. As the user performs the trick play operations, his device (the client) records the location of the trick play with reference to the play time of the content. The locations of the trick plays, or "hot spots," correspond to portions of the content that are of particular interest. This recorded information is considered location information. The client may then communicate the location information to the server as the trick plays occur, or may store the location information for later communication to the server.

At this point, the digital movie provider (server) has a copy of the movie (content) and trick play information associated with the movie. The trick play information may be used by subsequent clients to speed up downloading. In particular, the digital movie provider may provide portions, or chunks, of the content corresponding to the "hot spots" at a greater data rate than the other portions of the content. Accordingly, the portions of the movie that previous viewers had considered particularly important—due to the fact that they are associated with a trick play—may be provided to a current client first and at a high data rate.

Now, presume that a second user later selects the same movie from the server for viewing via a second client device. Second client device downloads not only the movie (content) but also the trick play location information associated with the movie, which was provided by the first client. The second client may be provided with a graphic interface indicating the downloading of the content. This graphic interface, such as a playback indicator, may indicate the "hot spots" as provided by previous clients. Chunks of the content data corresponding to these "hot spots" may be downloaded before other content and at a higher rate. As such, in this example, a first quickly downloaded chunk of data might correspond to the hot spot right after the opening credits of the movie. Should the second client choose, during downloading of the content, the client may jump to the quickly downloaded hot spot—the portion right after the opening credits (thus skipping the opening credits).

Example aspects of the present invention will now be described in greater detail with reference to FIGS. 1-5.

Figure 1:
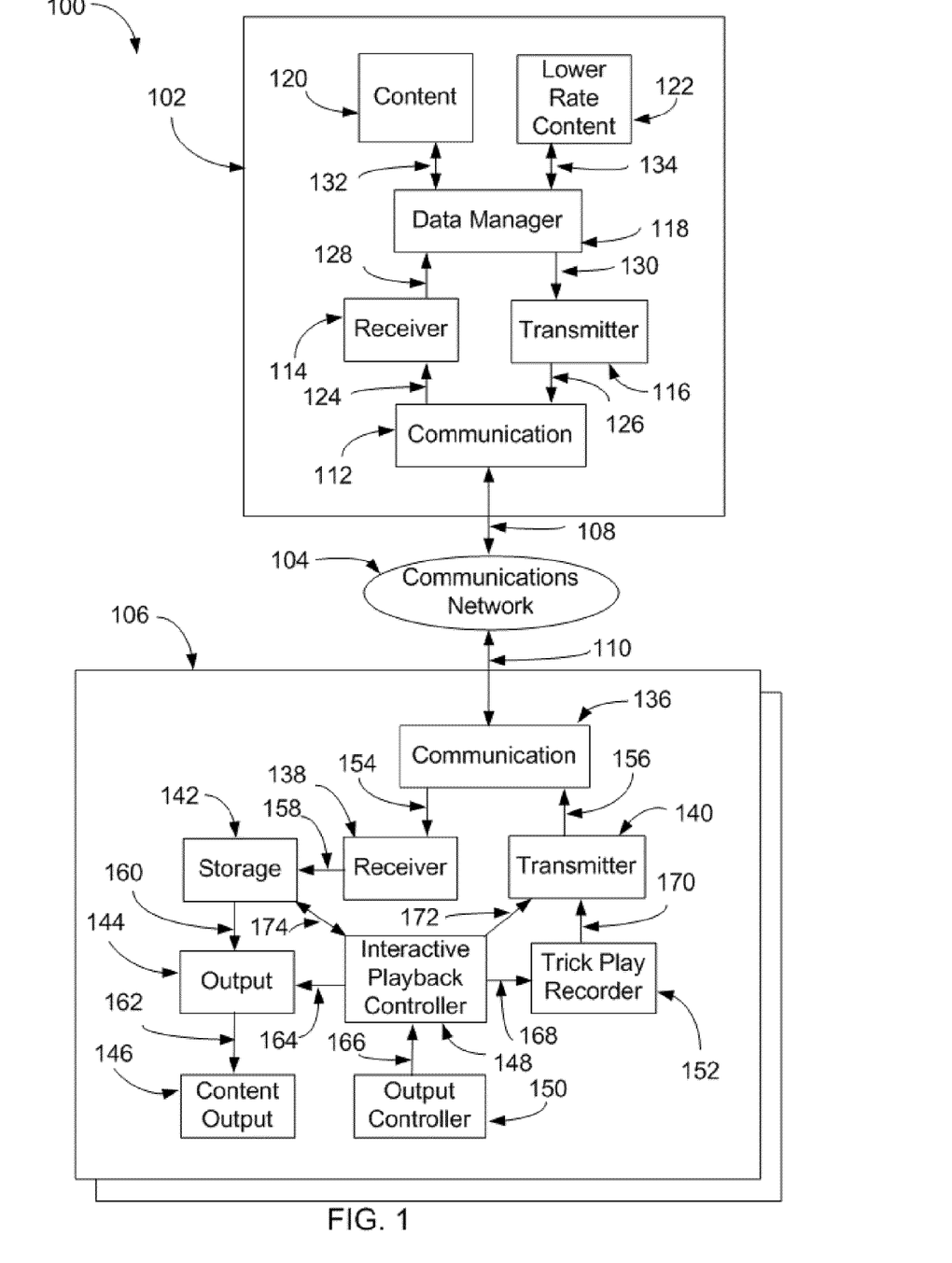
FIG. 1 is an illustration for an example communication system, in accordance with an aspect of the present invention.

FIG. 1 is an illustration for an example communication system 100, in accordance with an aspect of the present invention.

Communication system 100 includes a server 102, a communications network 104 and a multiplicity of clients with a sampling noted as a client 106.

Communications network 104 is arranged to communicate bi-directionally with server 102 via a communication channel 108 and with client 106 via a communication channel 110.

Server 102 stores, manages and delivers content or chunks of content. A chunk of content represents a portion or a partial segment of content. As an example, server 102 may provide a downloaded video for viewing via streaming. Communications network 104 provides bi-directional communications between entities connected to the communications network. As an example, communications network 104 may be configured as the Internet or a cable TV system. Client 106 receives, transmits, stores and manages content. As an example, client 106 may receive a video to be provided for viewing. Furthermore, video may be received for viewing using streaming download.

Server 102 includes a communication portion 112, a receiver portion 114, a transmitter portion 116, a data manager portion 118, a content storage portion 120 and a lower rate content storage portion 122. The term "portion" may be used to represent a distinct device or a part of a device. In this example embodiment, each of communication portion 112, receiver portion 114, transmitter portion 116, data manager portion 118, content storage portion 120 and lower rate content storage portion 122 are distinct devices. In some embodiments, at least two of communication portion 112, receiver portion 114, transmitter portion 116, data manager portion 118, content storage portion 120 and lower rate content storage portion 122 may be combined as a unitary device. In other embodiments, at least one of communication portion 112, receiver portion 114, transmitter portion 116, data manager portion 118, content storage portion 120 and lower rate content storage portion 122 may be implemented as a computer having stored therein tangible computer-readable media for carrying or having computer-executable instructions or data structures stored thereon. The term "portion" may be used to represent a distinct device or a part of a device. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible computer-readable medium. Combinations of the above should also be included within the scope of tangible computer-readable media.

Communication portion 112 is arranged to communicate bi-directionally with communications network 104 via communication channel 108. Receiver portion 114 is arranged to receive information from communication portion 112 via a communication channel 124. Communication portion 112 is arranged to receive information from transmitter portion 116 via a communication channel 126. Data manager portion 118 is arranged to receive information from receiver portion 114 via a communication channel 128. Transmitter portion 116 is arranged to receive information from data manager portion 118 via a communication channel 130. Data manager portion 118 is arranged to communicate bi-directionally with content storage portion 120 via a communication channel 132 and with lower rate content storage portion 122 via a communication channel 134.

Communication portion 112 provides bi-directional communication between server 102 and external entities. Receiver portion 114 receives trick play location information. Transmitter portion 116 transmits content and trick play location information. Data manager portion 118 receives, processes and manages content and trick play location information. Content storage portion 120 receives, stores and retrieves content and trick play location information. Lower rate content storage portion 122 receives, stores and retrieves lower rate content and trick play location information.

Client 106 includes a communication portion 136, a receiver portion 138, a transmitter portion 140, a storage portion 142, an output portion 144, a content output portion 146, an interactive playback controller portion 148, an output controller portion 150 and a trick play recorder portion 152. In this example embodiment, each of communication portion 136, receiver portion 138, transmitter portion 140, storage portion 142, output portion 144, content output portion 146, interactive playback controller portion 148, output controller portion 150 and trick play recorder portion 152 are distinct devices. In some embodiments, at least two of communication portion 136, receiver portion 138, transmitter portion 140, storage portion 142, output portion 144, content output portion 146, interactive playback controller portion 148, output controller portion 150 and trick play recorder portion 152 may be combined as a unitary device. Further, in some embodiments, at least one of communication portion 136, receiver portion 138, transmitter portion 140, storage portion 142, output portion 144, content output portion 146, interactive playback controller portion 148, output controller portion 150 and trick play recorder portion 152 may be implemented as a computer having stored therein tangible computer-readable media for carrying or having computer-executable instructions or data structures stored thereon.

Receiver portion 138 is arranged to receive information from communication portion 136 via a communication channel 154. Communication portion 136 is arranged to receive information from transmitter portion 140 via a communication channel 156. Storage portion 142 is arranged to receive information from receiver portion 138 via a communication channel 158. Output portion 144 is arranged to receive information from storage portion 142 via a communication channel 160. Content output portion 146 is arranged to receive information from output portion 144 via a communication channel 162. Output portion 144 is arranged to receive information from interactive playback controller portion 148 via a communication channel 164. Interactive playback controller portion 148 is arranged to receive information from output controller portion 150 via a communication channel 166.

Trick play recorder portion 152 receives information from interactive playback controller portion 148 via a communication channel 168. Transmitter portion 140 receives information from trick play recorder portion 152 via a communication channel 170. Transmitter portion 140 receives information from interactive playback controller portion 148 via a communication channel 172. Interactive playback controller portion 148 communicated bi-directionally with storage portion 142 via a communication channel 174.

In operation, a user (not shown) views content available for access via content output portion 146. User then selects to access content via output controller portion 150.

A content request is communicated to interactive playback controller portion 148 via communication channel 166.

A request for trick play location information is communicated to data manager portion 118 from interactive playback controller portion 148 via communication channel 172, transmitter portion 140, communication channel 156, communication portion 136, communication channel 110, communications network 104, communication channel 108, communication portion 112, communication channel 124, receiver portion 114 and communication channel 128.

Data manager portion 118 receives the request for trick play location information and retrieves information from lower rate content storage portion 122.

Data manager portion 118 communicates trick play location information to storage portion 142 via communication channel 130, transmitter portion 116, communication channel 126, communication portion 112, communication channel 108, communications network 104, communication channel 110, communication portion 136, communication channel 154, receiver portion 138, communication channel 158 and storage portion 142.

Interactive playback controller portion 148 retrieves and processes trick play location information from storage portion 142 for determining content and lower rate content to be downloaded.

Interactive playback controller portion communicates a request for content and lower rate content from data manager portion 118 via transmitter portion 140, communication portion 136, communications network 104, communication portion 112 and receiver portion 114.

Data manager portion 118 receives request for content and retrieves content from content storage portion 120 and from lower rate content storage portion 122.

Data manager portion 118 initiates communication of content and lower rate content to storage portion 142 via communication channel 130, transmitter portion 116, communication channel 126, communication portion 112, communication channel 108, communications network 104, communication channel 110, communication portion 136, communication channel 154, receiver portion 138, communication channel 158 and storage portion 142.

Upon initial receipt of content and lower rate content by storage portion 142, output portion 144 initiates retrieval of content from storage portion 142 via communication channel 160 and presents content to content output portion 146 via communication channel 162.

User may select to view a different portion of the content than what is being presented via output controller portion 150. For example, user may select to view a different portion of the content by selecting a playback indicator. Interactive playback controller portion 148 receives presentation request from output controller portion 150 via communication channel 166 and communicates request to trick play recorder portion 152.

Trick play recorder portion 152 may store trick play location information for later communication to server 102 or may communicate trick play location information to server 102 upon receipt. Trick play location information may be communicated from trick play recorder portion 152 to data manager portion 118 via transmitter portion 140 communication portion 136, communications network 104, communication portion 112 and receiver portion 114. Data manager portion 118 receives, stores and processes trick play location information upon receipt.

Interactive playback controller portion 148 instructs output portion 144 to present the selected content to content output portion 146. If portion to view is associated with lower rate content, then output portion 144 initiates presentation of lower rate content to content output portion 146.

Interactive playback controller portion 148 requests download of new content request from data manager portion 118 via transmitter portion 140, communication portion 136, communications network 104, communication portion 112, receiver portion 114 and data manager portion 118.

Data manager portion 118 receives request for new content and requests new content from content storage portion 120. After receipt of new content, data manager portion 118 communicates new content to storage portion 142 via transmitter portion 116, communication portion 112, communications network 104, communication portion 136 and receiver portion 138.

Upon receipt of new content by storage portion 142, output portion 144 ceases presentation of lower rate content to content output portion 146 and initiates presentation of new content to output portion 144.

Interactive playback controller portion 148 provides location information to data manager portion 118 via transmitter portion 140, communication portion 136, communications network 104, communication portion 112 and receiver portion 114.

Data manager portion 118 processes received location information and stores processed information in lower rate content storage portion 122.

FIG. 1 is an illustration for an example communication system where trick play location information is downloaded upon receipt of a request for accessing content. Furthermore, content and lower rate content are downloaded based upon trick play location information. Furthermore, upon receipt of a request for accessing content in a different location, lower rate content may be presented for viewing without experiencing a delay. Furthermore, while lower rate content is being accessed, request for downloading for new content is initiated and upon receipt of new content, presentation of lower rate content is terminated and presentation of new content is initiated. Furthermore, location information is uploaded from client to server. Communication system 100 provides the capability to view forward-in-time portions of a video at a lower rate until a higher rate version of the content has been downloaded and is available for presentation.

Figure 2A:
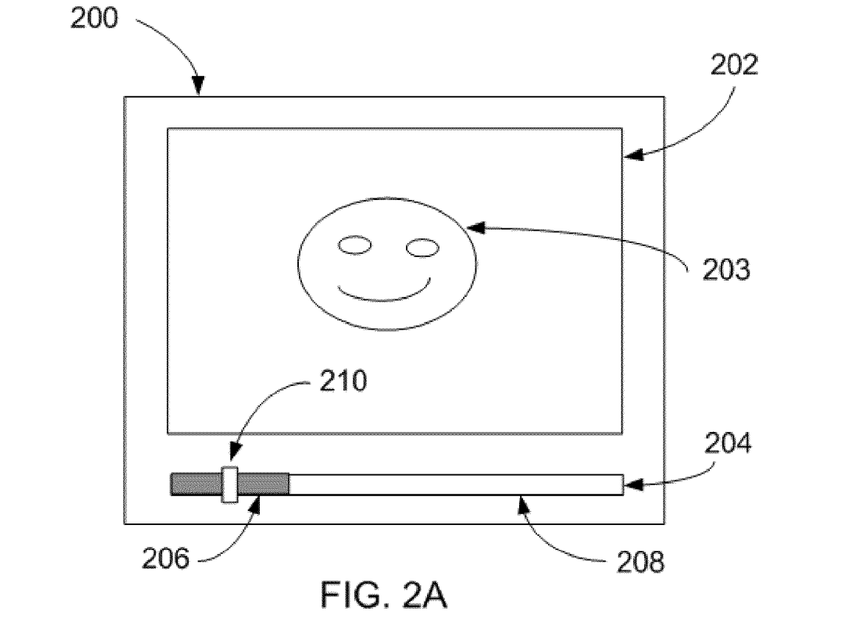
FIG. 2A is an illustration for a conventional presentation device.

FIG. 2A is an illustration for a presentation device 200.

Presentation device 200 includes a presentation area 202 and a playback indicator 204.

Presentation device 200 enables access to content. Non-limiting examples for presentation device 200 include tablet device, computer monitor, smartphone device, gaming device, laptop computer screen and netbook computer screen. For example, a user interfacing with a computer may be browsing a catalog of videos available for viewing and may view available videos for selection and may select to view a selected video via presentation device 200.

Presentation area 202 enables accessing content. For example, a user views a video via presentation area 202. For this example, a high resolution snapshot of the video is presented as a high resolution video snapshot 203.

Playback indicator 204 presents the status of a video download and enables selection for the location of video playback. For example, a user may select the location for viewing a video by selecting a proportional location associated with playback indicator 204.

A playback download indicator 206 represents the quantity of content or chunk of content downloaded for accessing. For example, playback download indicator 206 located at one fourth the length of playback indicator 204 indicates one fourth of a video selected for download has been downloaded.

A playback not downloaded indicator 208 represents the quantity of content or chunk of content not downloaded. For example, playback not downloaded indicator 208 located at three fourths the length of playback indicator 204 indicates three fourths of a video selected for download has not been downloaded.

A playback indicator location selector 210 provides an indication for the current location for accessing content and for selecting the location for access. In this example, playback indicator location selector 210 provides a visual indication of the trick play location information based on the input content. For example, playback indicator location selector 210 located at one eighth of the length of playback indicator 204 indicates the current portion of the video is located at one eighth the length of the video. Furthermore, moving playback indicator location selector 210 to three fourths of playback indicator 204 provides an indication that the content is to be presented at the three fourths point of the content. For example, a user may select to play previous portions of a video by selecting to move playback indicator location selector 210 to the left of its current position. Furthermore, a user may select to play future portions of a video by selecting to move playback indicator location selector 210 to the right of its current position.

Figure 2B:
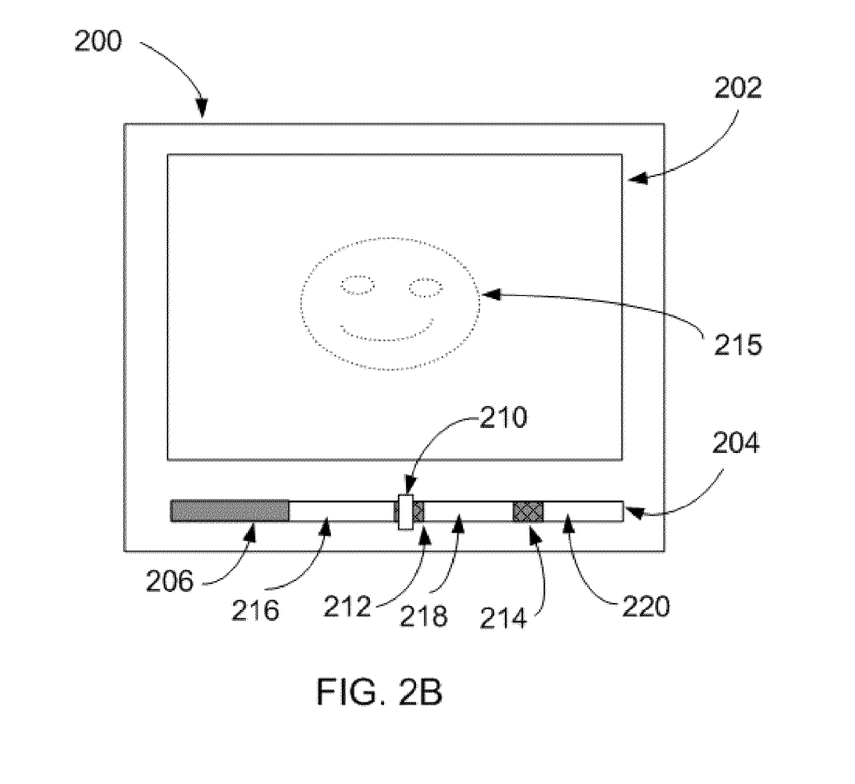
FIG. 2B is an illustration for example presentation device, in accordance with an aspect of the present invention.

FIG. 2B is an illustration for example presentation device 200, in accordance with an aspect of the present invention.

A lower rate playback indicator 212 and a lower rate playback indicator 214 represent the location and quantity of lower rate content which has been downloaded.

Lower rate playback indicator 212 and lower rate playback indicator 214 are determined as frequently selected points for downloading content. For example, a user may be viewing a video via presentation device 200 at a certain location and the user may decide to view the video at a different location. Furthermore, the frequency for selecting portions of a video for viewing are stored and processed in order to determine video portions frequently selected for viewing.

For this example, playback indicator location selector 210 has been moved to select lower rate playback indicator 212 and as a result a lower resolution video snapshot noted as a lower resolution video snapshot 215 is presented for viewing.

An infrequently selected video indicator 216, an infrequently selected video indicator 218 and an infrequently selected video indicator 220 provide an indication of portions of content not frequently selected for viewing. For example, a user viewing a video tends not to view portions of a video associated with infrequently selected video indicator 216, 218 and 220.

In operation, content is selected for access via presentation area 202. Content (e.g. higher resolution) and lower rate content (e.g. lower resolution) are downloaded with indicators associated with content and lower rate content which provide an indication of the location and quantity of content downloaded (e.g. playback download indicator 206) and lower rate content downloaded (e.g. lower rate playback indicator 212, 214). Furthermore, a user may select the location for accessing content via a playback indicator selection (e.g. playback indicator location selector 210). Furthermore, a user selecting to view portions of content not already downloaded may experience a delay as the content is downloaded. Furthermore, a user may select to view without delay lower rate content via selection of lower rate indicators (e.g. lower rate playback indicator 212, 214). Furthermore, lower rate content (e.g. lower resolution video) may be provided to user until higher quality content (e.g. higher resolution video) is downloaded. As an example, a user may select to view a video and after viewing a portion of the video decide to skip ahead and view later portions of the video. Furthermore, the user may select to view without delay lower rate portions of the video which have been downloaded. Furthermore, higher quality content is presented with lower rate content ceases to be presented with higher quality content being presented in its place following download of higher quality content.

Figure 3:
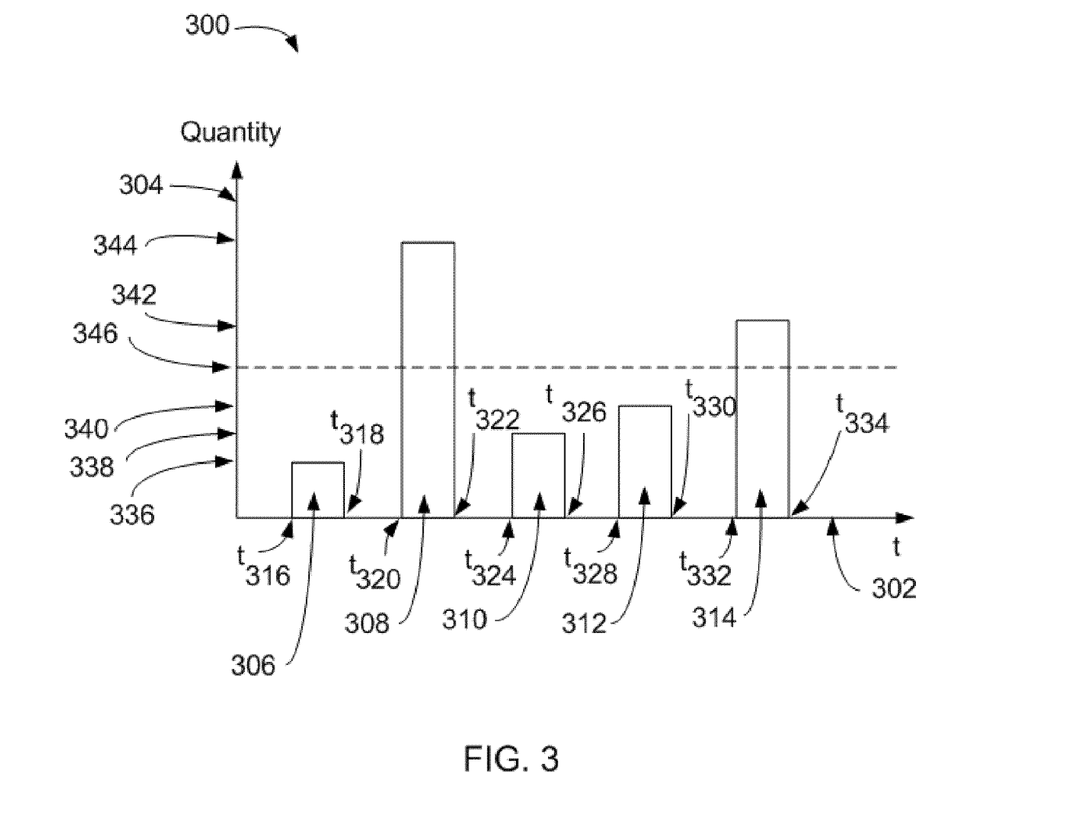
FIG. 3 is an example histogram chart illustrating frequency of selection for portions of content, in accordance with an aspect of the present invention.

FIG. 3 is an example histogram chart 300 illustrating frequency of selection for portions of content, in accordance with an aspect of the present invention.

Histogram chart 300 includes an x-axis 302 and a y-axis 304.

The x-axis 302 represents time with units of seconds and y-axis 304 represents number of occurrences. As a non-limiting example, y-axis 304 may be represented by the number of occurrences per user.

A bar indicator 306 represents the number of occurrences per user, noted by a quantity 336, occurring between a time $t_{316}$ and a time $t_{318}$ associated with a portion of accessed content.

A bar indicator 308 represents the number of occurrences per user, noted by a quantity 344, occurring between a time $t_{320}$ and a time $t_{322}$ associated with a portion of accessed content.

A bar indicator 310 represents the number of occurrences per user, noted by a quantity 338, occurring between a time $t_{324}$ and a time $t_{326}$ associated with a portion of accessed content.

A bar indicator 312 represents the number of occurrences per user, noted by a quantity 340, occurring between a time $t_{328}$ and a time $t_{330}$ associated with a portion of accessed content.

A bar indicator 314 represents the number of occurrences per user, noted by a quantity 342, occurring between a time $t_{332}$ and a time $t_{334}$ associated with a portion of accessed content.

A threshold indicator 346 represents a threshold for determining whether a portion of content has been frequently accessed or not frequently accessed.

Bar indicator 308 and bar indicator 314 have frequencies greater than threshold indicator 346, therefore, the content portions associated with bar indicator 308 and bar indicator 314 may be considered as frequently selected for access. For example, portions of a video associated with bar indicator 308 and bar indicator 314 may be frequently selected by users for viewing.

Conversely, bar indicators 306, 310 and 312 have frequencies of access less than threshold indicator 346, therefore, the content portions associated with bar indicators 306, 310 and 312 may be considered as not frequently selected for access.

In operation, the frequency of occurrence for portions of content are maintained for a multiplicity of users. Content portions with frequency of content greater than a threshold are noted as frequently accessed with other portions of content noted as not frequently accessed.

FIG. 3 is an example histogram chart illustrating frequency of selection for portions of content with a threshold used for determining frequently selected content portions.

Figure 4:
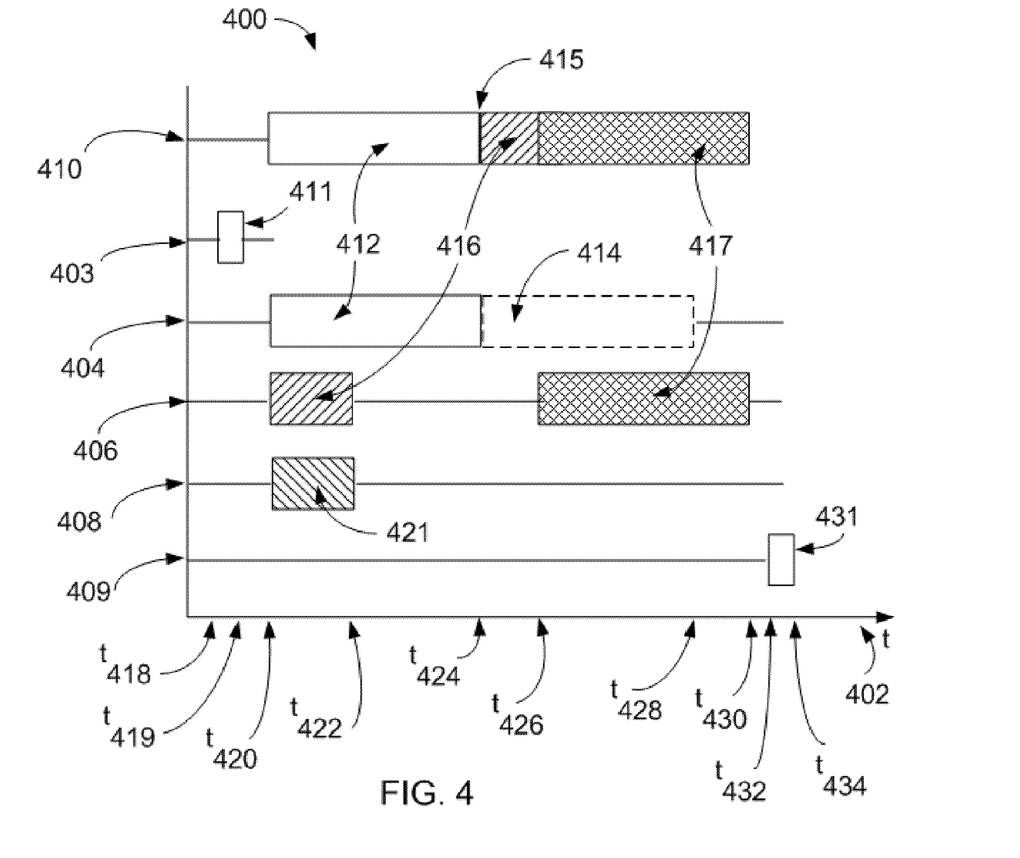
FIG. 4 is an example timing chart illustrating download of location information, download of content, download of lower rate content, presentation of content and upload of location information, in accordance with an aspect of the present invention.

FIG. 4 is an example timing chart 400 illustrating download of location information, download of content, download of lower rate content, presentation of content and upload of location information, in accordance with an aspect of the present invention.

Timing chart 400 includes an x-axis 402, a waveform 403, a waveform 404, a waveform 406, a waveform 408, a waveform 409 and a waveform 410.

The x-axis 402 represents time with units of seconds. Waveform 403 represents timing for download of trick play location information from server to client. Waveform 404 represents timing for download of content from server to client with download of content interrupted by selection of different content for download. Waveform 406 represents timing for initially downloading lower rate content from server to client followed by download of the alternative content after selection of the alternative content for access. Waveform 408 represents timing for downloading lower rate content not selected for download from server to client. Waveform 409 represents timing for uploading of location information from client to server. Waveform 410 represents timing illustrating presentation of content followed by presentation of lower rate content followed by presentation of alternative selected content.

For waveform 403, a trick play location information 411 initiates download at a time $t_{418}$ and completes download at a time $t_{419}$. Trick play location information 411 provides a description of available frequently selected lower rate content available for download.

For waveform 404, a content 412 initiates download at a time $t_{420}$ and following selection of alternative content for access terminates download at $t_{424}$. A content absence 414 initiating at a time $t_{424}$ and terminating at a time $t_{428}$ represents content initially scheduled for download but not downloaded as a result of a user selecting access for alternative content.

For waveform 406, a lower rate content 416 initiates download at a time $t_{420}$ and completes download at a time $t_{422}$. Lower rate content 416 represents content frequently selected by prior users. As an example, the frequency of selection may be represented by bar indicator 308 or bar indicator 314 as discussed with reference to FIG. 3. A content 417 initiating at a time $t_{426}$ and completing at a time $t_{430}$ represents alternative content selected for download. Lower rate content 416 represents a lower rate partial version of higher rate content 417.

For waveform 408, a lower rate content 421 initiates download at a time $t_{420}$ and completes download at a time $t_{422}$. Lower rate content 421 represents content frequently selected by prior users but not selected for access.

For waveform 409, a trick play location information 431 initiates upload from client to server at a time $t_{432}$ and completes upload at a time $t_{434}$. Trick play location information 431 represents content location information as performed by client. Upload of trick play location information has been presented in the example as following the viewing of content, however upload of trick play location information may occur any time following selection for access by a user as noted by time $t_{424}$.

For waveform 410, content 412 initiates at a time $t_{420}$ and terminates at a time $t_{424}$. Lower rate content 416 initiates at a time $t_{424}$ and terminates at a time $t_{426}$. Content 417 initiates at a time $t_{426}$ and terminates at a time $t_{430}$. Preemption for presenting content 412 occurs at time $t_{424}$ as noted by a preemption point 415. Following preemption point 415, lower rate content 416 is presented until content 417 is available for presentation at time $t_{426}$ at which time content 417 is presented for viewing. Content 412 may be represented by high resolution video snapshot 203 as described with reference to FIG. 2 and lower rate content 416 may be represented by lower resolution video snapshot 215 as described with reference to FIG. 2.

In operation, trick play location information 411 initiates downloading from server to client at time $t_{418}$ and completes upload at time $t_{420}$. Content 412, lower rate content 416 and 421 initiate downloading at time $t_{420}$. Presentation of content 412 initiates at time $t_{420}$ (or after a slight delay). At time $t_{424}$, user selects to view a different content noted as content 417. Instead of presenting content 417, lower rate content 416 is presented. While lower rate content 416 is presented, a request for downloading content 417 is performed. After initial receipt of content 417 at time $t_{426}$, content 417 is presented for access. Presentation of lower rate content 416 is terminated before it has been fully presented since higher rate content 417 is available for presenting. Presentation of content terminates at time $t_{430}$. As an example, a user selects to view a video with selected content presented as content 412. User decides to skip ahead in the video and select to view content 417, but content 417 has not been downloaded yet, so as an alternative, lower rate content 416 which has already been downloaded is presented to user instead of content 417.

Following receipt of content 417, presentation of lower rate content 416 is preempted with presentation of content 417.

FIG. 4 is an example timing chart illustrating download of trick play location information, download of content, download of frequently selected lower rate content, presentation of content, presentation of frequently selected lower rate content, download and presentation of alternative content and upload of location information. Furthermore, download and presentation of content is preempted for presentation of prior downloaded frequently selected lower rate content. Furthermore, presentation of lower rate content is preempted following download of a higher rate version of the lower rate content.

Figure 5:
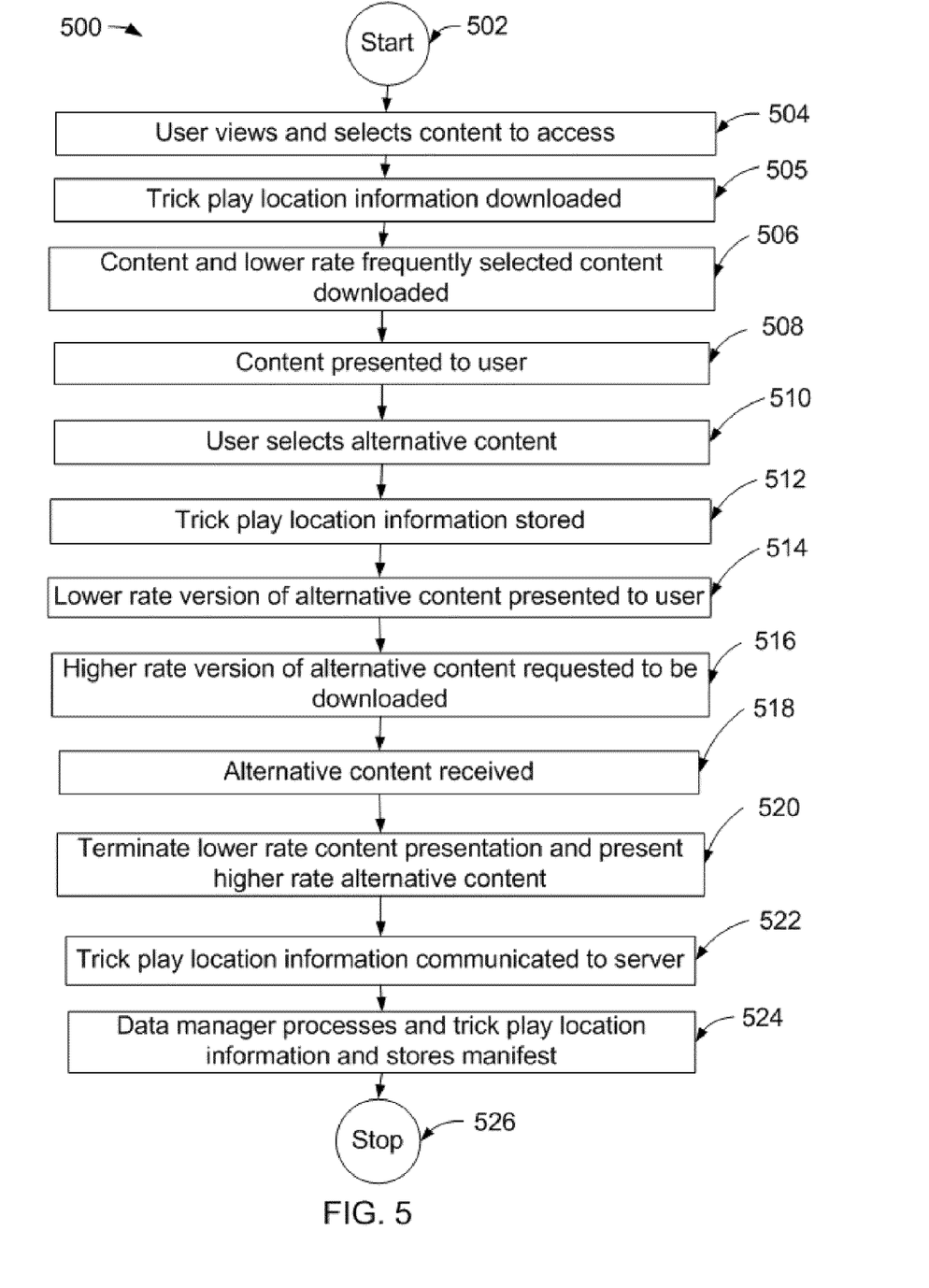
FIG. 5 illustrates an example method for providing lower rate content followed by higher rate content as a result of forward selection of access to content, in accordance with an aspect of the present invention.

FIG. 5 illustrates an example method 500 method for providing lower rate content followed by higher rate content as a result of forward selection of access to content, in accordance with an aspect of the present invention.

Method 500 starts (S502) with a user viewing accessible content and selecting to access content (S504). For example, a user may request a movie for downloading and viewing.

With additional reference to FIG. 1, a user views accessible content via content output portion 146 and selects content for downloading via output controller portion 150. Request for content is communicated to data manager portion 118 via interactive playback controller portion 148, transmitter portion 140, communication portion 136, communications network 104, communication portion 112 and receiver portion 114.

Returning to FIG. 5, then trick play location information associated with frequently selected lower rate content is downloaded from server to client (S505). As an example, a video selected by a user for viewing may have lower rate frequently selected video available for downloading, which is described by the trick play location information.

With reference to FIG. 1, data manager portion 118 requests and receives trick play location information from lower rate content storage portion 122. Furthermore, data manager portion 118 communicates trick play location information to storage portion 142 via transmitter portion 116, communication portion 112, communications network 104, communication portion 136 and receiver portion 138 per the timing information as described with reference to waveform 403.

Returning to FIG. 5, then content and lower rate frequently selected content are downloaded from server to client (S506). As an example, movie selected by user is downloaded from server to client.

With reference to FIG. 1, data manager portion 118 requests and receives content from content storage portion 120. Data manager portion 118 requests and receives lower rate content from lower rate content storage portion 122. Furthermore, data manager portion 118 communicates content as described with reference to waveform 404, as shown in FIG. 4, and lower rate content as described with reference to waveform 406 and waveform 408 to storage portion 142 via transmitter portion 116, communication portion 112, communications network 104, communication portion 136 and receiver portion 138.

Returning to FIG. 5, then downloaded content is provided to user (S508). As an example, a video downloaded to client is presented for user to view.

With reference to FIGS. 1 and 4, content is retrieved from storage portion 142 and communicated to content output portion 146 for access by user as described with reference to waveform 410.

Returning to FIG. 5, then user selects to view alternative content located forward-in-time (S510). For example, a user selects to view a different portion of a video by selecting the location on the playback indicator representing the location of the video for viewing, where the viewing location selected is associated with lower rate video already downloaded to the client.

With reference to FIGS. 1 and 4, a user communicates request to view alternative content located forward-in-time to interactive playback controller portion 148 via output controller portion 150, as described with reference to time $t_{424}$. Furthermore, with additional reference to FIG. 2, the user may select the location for viewing the alternative video by selecting lower rate playback indicator 212 associated with playback indicator 204, where lower rate playback indicator 212 is associated with lower rate content already downloaded to client 106.

Returning to FIG. 5, then trick play location information is processed and stored (S512). For example, the user selects to view a movie at the midway point with location information associated with the midway point stored for later communication to the server.

With reference to FIG. 1, interactive playback controller portion 148 communicates location information associated with video portion selected to trick play recorder portion 152.

Returning to FIG. 5, then lower rate version of alternative content is presented to viewer (S514). For example, following user selecting to view forward-in-time content, the current content being presented ceases and a lower rate version of the content selected is presented.

With reference to FIGS. 1 and 4, interactive playback controller portion 148 informs output portion 144 to cease presenting initial content and to initiate presenting lower rate content. Output portion 144 ceases presenting initial content to content output portion 146 as described with reference to waveform 410, retrieves lower rate content from storage portion 142 and presents lower rate content to content output portion 146 as described with reference to waveform 410.

Returning to FIG. 5, then client requests higher rate content from server (S516). As an example, the forward-in-time portion of video selected by user is downloaded from server to client.

With reference to FIG. 1, interactive playback controller portion 148 requests the higher rate version of the content selected by user from data manager portion 118 via transmitter portion 140, communication portion 136, communications network 104, communication portion 112 and receiver portion 114.

Returning to FIG. 5, then alternative higher rate content is received by client from server (S518). As an example, the portion of video selected by user for viewing is downloaded from the server to the client.

With reference to FIGS. 1 and 4, data manager portion 118 requests and receives higher rate content from content storage portion 120 followed by communicating higher rate content to storage portion 142 as described with reference to waveform 406 via transmitter portion 116, communication portion 112, communications network 104, communication portion 136 and receiver portion 138.

Returning to FIG. 5, then presentation of lower rate content is terminated followed by presentation of the higher rate content (S520) selected by user. For example, presentation of lower rate movie portion is terminated with the video portion selected being presented to the user.

With reference to FIGS. 1 and 4, output portion 144 ceases communicating lower rate content to content output portion 146 as described with reference to waveform 410. Furthermore, output portion 144 retrieves higher rate content from storage portion 142 and presents higher rate content to content output portion 146, as described with reference to waveform 410.

Returning to FIG. 5, then trick play location information is communicated from client to server (S522). As an example, the location information for the portion of the video selected by the user is communicated from the client to the server. Furthermore, trick play location information associated with a video may be communicated from a multiplicity of clients to server.

With reference to FIG. 1, trick play location information previously stored by trick play recorder portion 152 is communicated to data manager portion 118 via transmitter portion 140, communication portion 136, communications network 104, communication portion 112 and receiver portion 114.

Returning to FIG. 5, then data manager processes trick play location information (S524).

With reference to FIG. 1, data manager portion 118 processes and stores received location information to determine frequently viewed video portions for generating trick play location information. As discussed with reference to FIG. 3, data manager portion organizes video portions by frequency of selection and compares with a threshold for determining frequently selected video portions. Following processing of location information, data manager portion 118 stores trick play location information in lower rate content storage portion 122.

Returning to FIG. 5, execution of method 500 stops (S526).

FIG. 5 illustrates a method for providing a communication system for delivery of content and frequently selected lower rate content from a server to a client. Furthermore, client provide location information to server. Delivery of content may be preempted with frequently selected lower rate content by selection of content located forward in time. Furthermore, presentation of lower rate content is replaced with higher rate content once higher rate content has been received by client. Method provides a user with the capability to view forward-in-time portions of a video at a lower rate until a higher rate version of the content has been downloaded and is available for presentation.

The communication system may be described as a social network powered fast forward. Furthermore, the communication system may be described as an anticipatory trick play fast forward based upon typical user behavior. The communication system provides a server associated with an adaptive HTTP streaming system which can determine frequently selected portions of content based upon the behavior of users. The communication system may also determine frequently selected portions of content based upon the behavior of a particular user.

The frequently selected portions of content are typically of greater interest than other portions of content. Non-limiting examples of frequently selected portions of content include sporting event highlight, news highlight and scene changes.

Communication system provides bi-directional sharing of frequently selected location information between client and server. Server collects location selection information from a client or multiplicity of clients following selection of content by user. Server processes location selection information for determining frequently selected location information. Client selects to download content and information associated with frequently selected location information. Client reduces bandwidth for downloading content in order to download and store lower rate frequently selected content portions. After selection, lower rate frequently selected content portions are provided until a higher rate version of the content is downloaded whereupon the higher rate content is presented for access.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. An apparatus comprising:
   a receiver configured to receive the stream of input content, from a server, content
   including a stream of content and a chunk of content as downloaded data, where the chunk of content is located at a later time in the content than a currently received stream of the content, where the later time in the content is discontinuous from a current last time of the currently received stream of content;
   an interactive playback controller portion;
   a playback indicator configured to indicate a location of the chunk within discontinuous with the currently received stream of the content along a playback time line indicator including the stream of input content;
   a storage portion configured to store the downloaded data; and
   an output portion configured to output an output signal, based on the downloaded data, to the content output device,
   wherein said interactive playback controller portion is further configured to enable the user to instruct said output portion to output the chunk of content data as the output signal.

2. The system of claim 1, wherein said receiver is operable to receive the first portion of the stream of content at a first rate and to receive the chunk of content data at a second rate higher than the first rate.

3. The system of claim 2, further comprising:
   a trick play recorder; and
   a transmitter,
   wherein said interactive playback controller is further configured to enable the user to instruct said output portion to output a selected portion of the stream of input content at a user selected location in the content,
   wherein said trick play recorder is configured to store trick play user selected location information based on the first of the selected portion of the stream of input content, and
   wherein said transmitter is configured to transmit the trick play user selected location information to the server.

4. The system of claim 1, wherein said interactive
   playback controller is further configured to provide a visual indication of the location of the chunk along the timeline including the stream of content.

5. The method of claim 1, wherein a receiver receives the stream of content of
   a first quality before the chunk of content has finished downloading and receives the stream of content of a second quality after the chunk of content has finished downloading, where the second quality is higher than the first quality.

6. The method of claim 1, where the chunk of content is a hot spot of the content more likely to be of interest to a user than other content based on frequency of selection of a location of the hot spot in a time line of the content.

7. A content system for providing a first stream of input content to a first data device and for providing a second stream of input content to a second data device, the first data device being configured to provide trick play location information based on a first portion of the first stream of input content, said content system comprising:
   a receiver configured to receive the trick play location information provided by the first data device;
   a data manager configured to generate the second stream of input content data based on the first stream of input content and the trick play location information; and
   a transmitter configured to transmit the second stream of input content data to the second video data device.

8. The content system of claim 7, wherein said transmitter is operable to transmit a first portion of the second stream of input content data at a first rate and to transmit a second portion of the second stream of input content data at a second rate higher than the first rate.

9. The content system of claim 7, further comprising a storage portion configured to store the trick play information and information associating the trick play information with the input content.

10. The content system of claim 7, wherein the second stream of input content comprises a chunk of the first stream of input content corresponding to the first portion of the first stream of input content, where the chunk is located at a time in a time line of the first stream of input content indicated by the trick play location information.

11. The content system of claim 10,
   wherein the second stream of input content includes the first stream of input content and the chunk of the first stream of input content, and
   wherein the transmitter is configured to transmit the chunk of the first stream of input content to the second video data device prior to transmitting the corresponding first portion of the first stream of input content to the second video data device.

12. The content system of claim 7,
   wherein the receiver is configured to receive trick play location information related to the first stream of input content from multiple data devices, and
   wherein the data manager is configured to generate the second stream of input first stream of input content and based on the trick play location information from multiple data devices.

13. A method of providing a first stream of input content to a first data device and of providing a second stream of input content to a second data device, the first data device being configured to provide trick play location information based on a first portion of the first stream of input content, said method comprising:
   receiving, via a receiver, the trick play location information provided by the first data device;
   generating, via a data manager, the second stream of input content data based on the first stream of input content and the trick play location information; and
   transmitting, via a transmitter, the second stream of input content data to the second data device.

14. The method of claim 13, wherein said transmitting, via a transmitter, the second stream of input content data to the second data device comprises transmitting a first portion of the second stream of input content data at a first rate and transmitting a second portion of the second stream of input content data at a second rate lower than the first rate.

15. The method of claim 14, further comprising:
   storing, via a storage portion, the trick play information; and
   associating the trick play information with the input content.

16. The method of claim 13, wherein the second stream of input content comprises a chunk of the first stream of input content corresponding to the first portion of the first stream of input content, where the chunk is located at a time in a time line of the first stream of input content indicated by the trick play location information.

17. The method of claim 16,
   wherein the second stream of input content includes the first stream of input content and the chunk of the first stream of input content, and
   wherein transmitting comprises transmitting the chunk of the first stream of input content to the second data device prior to transmitting the first portion of the first stream of input content corresponding to the chunk to the second data device.

18. The method of claim 16,
   wherein the second stream of input content includes the first stream of input content and the chunk of the first stream of input content, and
   wherein transmitting comprises transmitting the first stream of input content at a first quality to the second data device before finishing transmitting the chunk of the first stream of input content and transmitting the first stream of input content at a second quality after finishing transmitting the chunk of the first stream of input content, where the second quality is higher than the first quality.

19. The method of claim 13,
   wherein receiving comprises receiving trick play location information related to the first stream of input content from multiple data devices, and
   wherein generating comprises generating the second stream of input content as hot spot of the first stream of input content likely to be of interest users based on the first stream of input content and based on the trick play location information received from multiple data devices indicating multiple data devices accessed the first portion of the first stream using trick play.

* * * * *

UNITED STATES PATENT AND TRADEMARK OFFICE
CERTIFICATE OF CORRECTION

| | | |
|---|---|---|
| PATENT NO. | : 8,886,765 B2 | Page 1 of 1 |
| APPLICATION NO. | : 13/285082 | |
| DATED | : November 11, 2014 | |
| INVENTOR(S) | : Howard P. Benn and Jian Jun Wu | |

It is certified that error appears in the above-identified patent and that said Letters Patent is hereby corrected as shown below:

Title Page, item (54) and in the Specification, Column 1, line 1, in the title, "PREDICITIVE" should be changed to --PREDICTIVE--

Signed and Sealed this
Fifth Day of January, 2016

Michelle K. Lee
*Director of the United States Patent and Trademark Office*